Patented July 18, 1939

2,166,702

UNITED STATES PATENT OFFICE 2,166,702

PROCESS FOR THE PREPARATION OF OXYGEN CONTAINING COMPOUNDS OF CERIUM

Joseph Blumenfeld, Neuilly-sur-Seine, France, assignor to Societe de Produits Chimiques des Terres Rares, Paris, France No Drawing. Application February 3, 1936, Serial No. 62,231. In France February 8, 1935

13 Claims. (Cl. 23—102)

It has long been known that it is possible to separate the oxide of cerium from the other rare earths by the hydrolysis of its tetravalent nitrate. But such a process has never achieved industrial success except on a very small scale, on account of the high cost of the cerium oxide hitherto obtained in this way.

The present invention has for its object the recovery of the nitrate ions present in the solution after hydrolysis. This recovery is accomplished by means of the formation of a nitrate, preferably the nitrate of an alkaline earth metal, or in more general terms the nitrate of a metal whose sulfate is less soluble than are the sulphates of the rare earth metals, and whose oxide, carbonate, or other equivalent compound is capable of precipitating the rare earths from their nitrate solutions.

The invention also comprises the means whereby the above-outlined process can be put into effect. All means of whatever nature which employ the steps indicated above, that is to say the step of hydrolysing tetravalent cerium nitrate followed by the subsequent step of utilising the nitrate ion in solution to build the nitrate of a metal whose ions possess the above-mentioned properties, forms a method of carrying out the invention. More particularly a preferred method of putting the invention into effect is as follows:

General statement of the preferred form of the process

A mixture of solid rare earth sulfates, is treated with an alkaline earth nitrate partly or wholly dissolved, and the solution of the rare earth nitrates so formed is separated from the precipitated alkaline earth sulphate and submitted to an oxidation treatment. This oxidation, if properly conducted, transforms only the nitrate of cerium to the tetravalent form. The ceric nitrate is then hydrolyzed, resulting in the precipitation of ceric compounds (for example hydrous oxide), a corresponding quantity of nitric acid being thereby liberated, while the other rare earth metals remain in solution as nitrates.

The nitrate ion remaining in solution is recovered by the addition of the carbonate of an alkaline earth metal which also precipitates the rare earth metals (as carbonates) from said solution. The alkaline earth nitrates, which are easily soluble, particularly when the solution is hot, are easily separated from the insoluble rare earth carbonates thus precipitated. The alkaline earth nitrate is then used for a further treatment of rare earth sulfates.

It is not however essential that the nitrate ions in question should follow a closed cycle. One can also, after appropriate treatment, sell the nitrate ions present in solution subsequent to hydrolysis either as nitric acid or as nitrates, and replace the nitrate ions thus eliminated from the cycle by an equivalent quantity of fresh nitrate ions.

In order to facilitate the comprehension of the above described process, two particular modes of execution are given by way of example.

Example 1

One attacks monazite sand with an acid, and prepares by known methods of treatment 7400 grs. of mixed sulfates of cerium and the other rare earths, the sulfates being both precipitated and filtered hot, and then dehydrated at 400° C. These sulfates give on titration about 58% of rare earths, expressed as oxides. The sulfates are next finely ground and are treated with 55 litres of an aqueous solution containing approximately 230 gr. of calcium nitrate per litre, and then made slightly acid with nitric acid in order to improve the white colour of the calcium sulfate finally obtained. The addition of the rare earth sulfates to the calcium nitrate solution is performed slowly, the sulfates being added in small quantities at a time and with constant stirring, so as to prevent any marked increase in temperature. When all the sulfates have been added, the stirring is continued for some time longer.

One then allows the calcium sulfate so obtained to settle, the precipitate is filtered, and the cake washed several times with water.

It is possible completely to thus free the cake from the rare earth and the nitrate ions which it contains. The degree of freedom which one seeks to obtain in practice depends firstly on the subsequent utilisation of the calcium sulfate, and secondly on the fact that the washings are added to the main bulk of the filtrate, which cannot if too dilute be returned to the cycle without preliminary evaporation.

For example it is possible to proceed, so far with the washing that one obtains a cake containing only 0.1% nitrate ions, and 1.5% rare earth ions, the two above figures being calculated with respect to dry $CaSO_4 2H_2O$ and the rare earths being expressed as oxides.

The gypsum obtained can be dried at 200° C. Its aspect and quality are most satisfactory: the colour is perfectly white and the crystals fine and regular.

The filtered solution (including the washings) measures 60 litres containing 70 grs. per litre of cerium and other rare-earth nitrates calculated as oxides, and approximately 37 grs. per litre of calcium nitrate, also calculated as oxide, and about 3 grs. per litre of $SO_4$ ions. These latter are eliminated by an appropriate addition of barium nitrate and the separation of the sulfate precipitate so formed (essentially pure barium sulfate).

The solution is then concentrated by evaporation until the concentration reaches 200 grs. of cerium and other rare earth oxides per litre, (these being present in the form of nitrates).

Next the solution is oxidised electrolytically in any known manner, the requisite quantity of nitric acid to convert all the cerium present from the trivalent to the tetravalent state being added.

One thus obtains 31.5 litres of nitrate solution containing approximately 98 gr. of $CeO_2$ per litre, (as nitrate).

The cerium is then separated from solution by hydrolysis. To this end the solution is added to boiling water to which has previously been added 140 gr. of sulphuric acid of 66 Bé. The solution is boiled for some time.

When the hydrolysis is finished, the precipitate is separated and washed several times, dried and calcined. The washings are added to the filtrate.

One thus obtains by the said calcination approximately 1900 gr. of $CeO_2$, substantially free from all other rare earths, and appropriate to serve as an opacifying agent for enamel, glass, or other kindred purposes.

The filtrate consists of 60 litres of a solution containing approximately 2.35 kilos of rare earth oxides (including a little cerium) and 2.2 kilos of CaO, in the form of nitrates, and also a total of 10.4 kilos of nitric acid, (a proportionate quantity of which is combined in the form of the above mentioned nitrates, the remainder being free acid).

If it be desired to recover the rare earths present in solution one adds sufficient $CaCO_3$ to neutralise the free acid and to precipitate the small quantities of cerium still remaining in the solution. A tetravalent compound of cerium is precipitated and separated by filtration.

To recover the nitric acid, one adds lime and submits the solution to prolonged heating, (at or near the boiling point, and continued until the reaction is complete, which may require several hours). The rare earths left after the separation of cerium are precipitated in this manner, and they also are separated by filtration.

There remain approximately 55 litres of a solution of calcium nitrate whose strength is approximately 228 gr. per litre. This solution serves, after a further addition of calcium nitrate, if so desired in order to bring the solution up to the initial strength (230 gr. per litre), for the attack of a fresh quantity of rare earth sulfates in the manner described above.

*Example 2*

A solution of rare earth sulphates, obtained for example from the attack of Travancore monazite sand, and containing approximately 80 gr. of rare earth oxides per litre, is brought to the boiling point. The rare earth sulfates, only slightly soluble under the above conditions are precipitated, and separated from the liquid.

One next prepares 2500 c. c. of a slightly acid solution of barium nitrate saturated at 100° C., and adds to this solid barium nitrate in such quantity as to obtain a total $Ba(NO_3)_2$ content of 1750 gr., partly in solution, and partly in the form of crystals. The rare earth sulfates are added to this solution. Barium sulfate is precipitated, and the rare earth nitrates pass into solution.

When the requisite quantity of rare earth sulfates (750 gr. calculated as mixed oxides) has been introduced, the solution is heated till double decomposition is substantially complete. The barium sulfate is separated by filtration and washed and is pure white.

The solution of rare earth nitrates, containing no excess of barium nitrate, is concentrated to a volume of 1340 c. c. and 160 c. c. of nitric acid 40 Bé. are added. As in the previous example, the cerium is oxidised electrolytically. When the oxidation of the cerium is substantially complete, that is to say when 95 to 97% of all of the cerium has been oxidized to the tetravalent condition, one hydrolyses the solution. For this purpose, one provides 6 litres of water, to which are added 25 gr. of sulphuric acid of 66 Bé., and brings the solution to the boiling point. While maintaining the solution at the boil, the solution of rare earth nitrates is added little by little.

The precipitate is allowed to settle and is separated by filtration. The solution containing almost exclusively the trivalent rare earths, is next treated while boiling with barium carbonate to precipitate the rare earths. The solution is filtered hot in order to prevent the crystallisation of the barium nitrate so formed. The filtrate is allowed to cool, when barium nitrate crystallises out. The barium nitrate so obtained serves for a further conversion of rare earth sulfates into nitrates.

The above two examples are merely given as an indication of the procedure employed in two particular instances, but are by no means to be construed as limitative. For instance, one may after hydrolysis only reintroduce the free nitric acid into the cycle, and crystallise out the nitrates. One may also, and this especially applies to the case when barium is the alkaline earth metal employed, sell the nitrates obtained at the end of the series of operations described, and replace them at the head of the said series of operations by an equivalent quantity of fresh nitrate ions. The sale of such nitrates is facilitated by their great purity.

I claim:

1. In a process for the preparation of rare earth nitrates, the steps of causing the mixed sulfates of the rare earth metals to react with a nitrate of an alkaline earth metal in the presence of a solvent made slightly acid with nitric acid, separating, washing and recovering the alkaline earth sulfate so formed.

2. Process for the preparation of rare earth nitrates comprising the following steps: (1) separating the mixed sulfates of the rare earth metals from a solution of the same (2) causing the mixed sulfates of the rare earth metals so obtained to react in the presence of a solvent with an alkaline earth nitrate (3) separating the solution of rare earth nitrates so obtained and (4) electrolytically oxidizing the cerium in said solution to the tetravalent state while holding same in solution, and (5) subjecting the cerium in the solution to hydrolysis.

3. Process for the preparation of rare earth nitrates comprising the following steps: (1) precipitating the mixed sulfates of the rare earth metals from a solution by raising the temperature of the said solution to about the boiling point (2) separating from the liquid the mixed sulphates so precipitated and adding the said mixed sulphates to a concentrated solution of an alkaline earth metal nitrate, and (3) separating the solution of rare earth nitrates from the precipitated alkaline earth sulphate.

4. Process for the preparation of rare earth nitrates comprising the following steps: (1) separating the mixed sulfates of the rare earth metals from a solution by raising its temperature (2) dehydrating the mixed sulfates so obtained (3) slowly adding the dehydrated rare earth sulphates to a solution of an alkaline earth metal nitrate, and (4) separating the concentrated solution of rare earth nitrates from the precipitated alkaline earth sulphate.

5. Process for the separation of cerium from the other rare earths comprising the following steps: (1) causing the mixed sulfates of the rare earths to react in the presence of a solvent, with an alkaline earth nitrate (2) separating the solution of rare earth nitrates so obtained (3) electrolytically oxidizing the solution to form ceric nitrate, and (4) hydrolyzing the ceric nitrate to precipitate a tetravalent compound of cerium.

6. Process for the preparation of cerium oxide, comprising the following steps: (1) causing the mixed sulfates of the rare earths to react in the presence of a solvent, with an alkaline earth nitrate, (2) separating the solution of rare earth nitrates so obtained (3) oxidizing the solution to form ceric nitrate (4) hydrolyzing the ceric nitrate to precipitate a tetravalent compound of cerium (5) washing the precipitate and (6) drying and calcining the product so obtained.

7. Process for the separation of cerium from the other rare earths present in a mixture of sulfates, comprising the following steps: (1) causing the mixed sulfates of the rare earth metals to react in the presence of a solvent, with an alkaline earth nitrate (2) separating the solution of rare earth nitrates so obtained (3) separating the cerium from the nitrates of the other rare earth metals, (4) precipitating the rare earth metals present as nitrates in the solution, after the removal of the cerium compound, by the addition of an alkaline earth compound capable of neutralizing an acid (5) removing the precipitate and (6) recovering the alkaline earth nitrate thus formed.

8. A cyclic process for the separation of cerium from the other rare earth metals comprising the following steps: (1) causing the mixed sulfates of the rare earths to react in the presence of a solvent, with an alkaline earth nitrate (2) separating the solution of rare earth nitrates so obtained (3) electrolytically oxidizing the solution to form ceric nitrate (4) hydrolyzing the solution to precipitate a tetravalent compound of cerium (5) removing the precipitate, (6) precipitating the rare earth metals present as nitrates in the solution by the addition of an alkaline earth compound capable of neutralizing an acid, (7) removing the precipitate (8) recovering the alkaline earth nitrate thus formed, and (9) using it for the conversion into nitrates of mixed sulfates of the rare earth metals.

9. In a process of conversion of mixed sulphates of the rare earths, the herein described improvement which comprises the steps of adding the mixed sulfates of the rare earth metals in a solid state, to an aqueous solution of an alkaline earth nitrate which is slightly acidified and well agitating the solution during and after such addition, until the reaction is sufficiently completed and then separating the precipitated calcium sulphate from the solution.

10. Process according to claim 5, in which there is added to the solution of rare earth nitrates, an amount of nitric acid sufficient to convert all trivalent cerium into tetravalent cerium.

11. Process according to claim 5, in which the sulfate ions remaining in the nitrate solution at the end of step (2) are precipitated by an addition of barium nitrate.

12. Process according to claim 5, in which the nitric acid is added between steps (2) and (3) to the nitrate solution, the quantity of such addition being at least sufficient to permit the transformation of the trivalent cerium nitrate into tetravalent cerium nitrate, by the subsequent electrolytic oxidation.

13. Process according to claim 7, in which the compound of an alkaline earth metal added in step (4) is calcium carbonate.

JOSEPH BLUMENFELD.